United States Patent Office 3,364,659
Patented Jan. 23, 1968

3,364,659
APPARATUS FOR CONTROLLING FLOW OF GASES THROUGH A PARTITION-ELUTION CHROMATOGRAPH
Hubert Pierrard and Gerard Jecko, Metz, France, assignors to Institut de Recherches de la Siderurgie Francaise, Saint Germain-en-Laye, Seine-et-Oise, France
Filed Nov. 1, 1965, Ser. No. 505,935
Claims priority, application France, Oct. 30, 1964, 993,257
4 Claims. (Cl. 55—197)

ABSTRACT OF THE DISCLOSURE

An apparatus for controlling gas flow through a chromatographic column having two identical control valves for the carrier gas and analyzed gas, which are operated pneumatically by a common source of compressed air to maintain identical pressures in the carrier and the analyzed gas before the gas is injected into the stream of carrier gas. The pressure of the gas discharged from the chromatographic column is held at a constant pressure higher than atmospheric pressure.

---

This invention relates to gas chromatography, and particularly to partition-elution chromatography in which a gas mixture to be analyzed is admitted to a partition column containing an adsorbent, and is eluted from the column by a carrier gas inert to the adsorbent.

Figure 1:
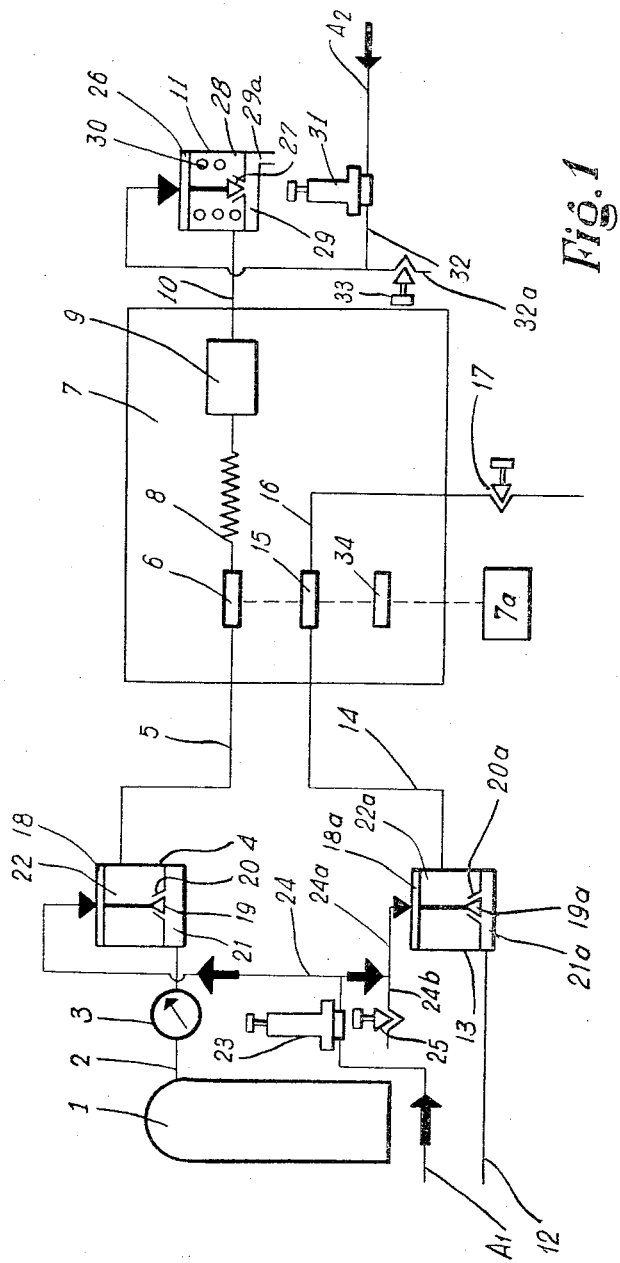
Figure 2:
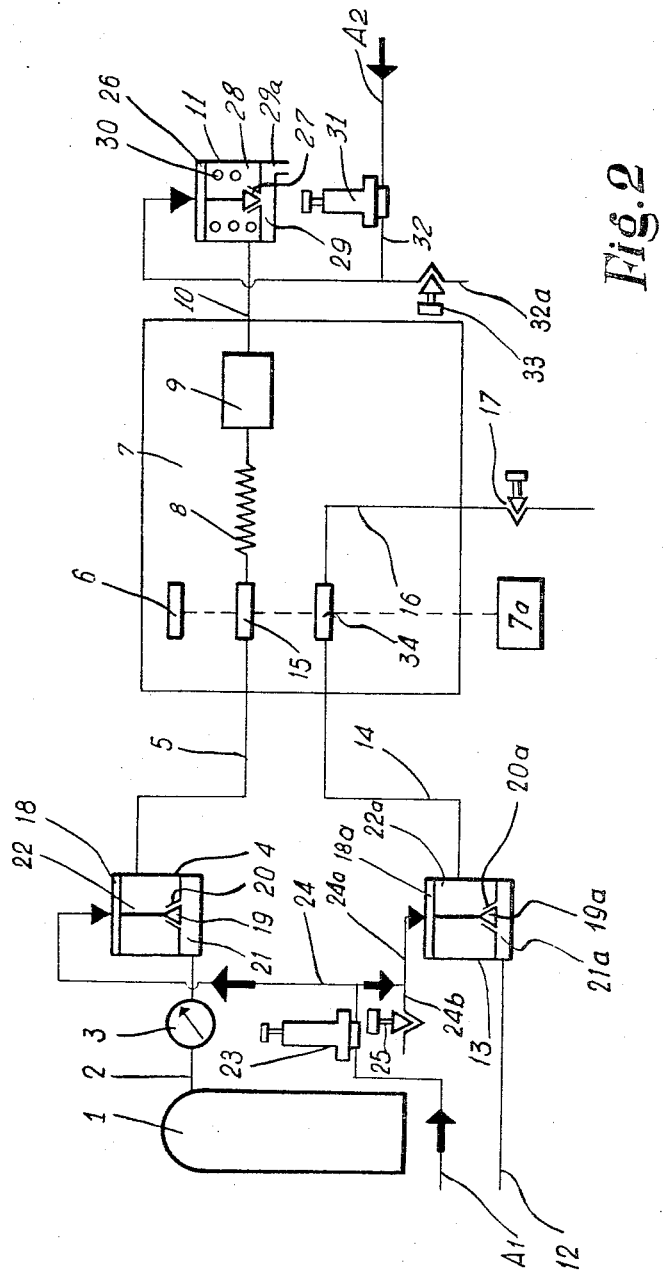
Figure 3:
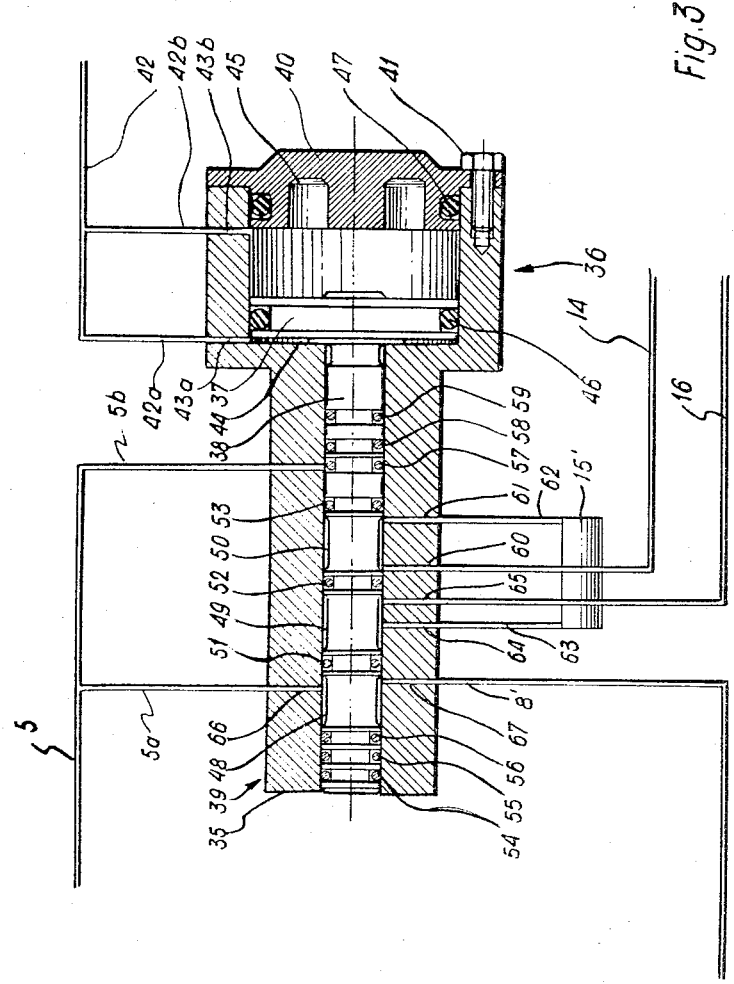
Figure 4:
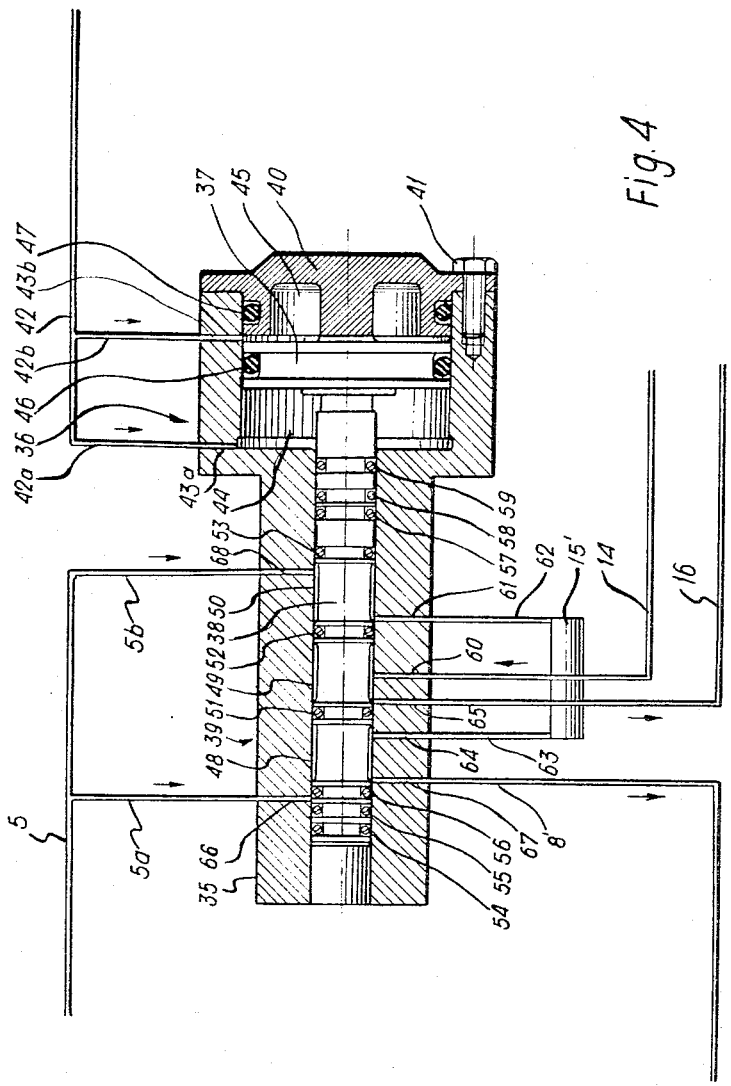

It has been found that the accuracy and precision of the measurements made in a gas chromatograph of the type described can be greatly improved by controlling the pressures of the several gases before they enter and as they leave the partition column. The exact nature of this invention as well as other objects and advantages thereof will be readily apparent from consideration of the following specification relating to the annexed drawing in which:

FIGS. 1 and 2 show a gas chromatograph of the invention and associated equipment in two operative positions, the view being diagrammatic; and FIGS. 3 and 4 show a modified detail for the apparatus of FIGS. 1 and 2 in elevational section.

Referring now to the drawing in detail, and initially to FIG. 1, there is shown a gas storage tank 1 containing helium at high pressure. A conduit 2 equipped with a gage and pressure reducer 3 connects the tank 1 to a pressure control device 4 which will presently be described in more detail. In the position of the apparatus shown in FIG. 1, the control device 4 is connected by a conduit 5 to the chamber 6 of a valve operated within a chromatograph enclosure 7 by an actuator 7a. The enclosure 7 is maintained at a constant temperature by a thermostat in a manner entirely conventional in itself, and not illustrated.

The chamber 6 is connected to the intake end of a column 8 in the chromatograph. The column 8 is packed with an adsorbent, in which the several constituents of the gas mixture to be analyzed have different partition coefficients. The details of the column have not been shown since they may be conventional, and are not themselves at the core of this invention. The discharge end of the column is connected with a detector 9 which may consist of two thermal conductivity cells arranged in a non-illustrated bridge circuit for comparing the thermal conductivity of the gas discharged from the column 8 with that of a stream of helium in a well-known manner, not shown, the difference between the thermal conductivities being recorded. A conduit 10 leads from the detector 9 to a pressure control device 11 which is vented to the atmosphere.

A sample conduit 12 is connected to non-illustrated processing equipment to draw a sample of a gas mixture therefrom, and to lead the mixture to a pressure control device 13. A conduit 14 connects the pressure control device to a chamber 15 of the afore-mentioned valve in the position of the apparatus illustrated in FIG. 1. The chamber 15 is vented to the atmosphere through a conduit 16 controlled by a needle valve 17.

The two pressure control devices 4, 13 are of identical construction and dimensions. They are connected to the chambers 6, 15, respectively, by conduits 5, 14 which have identical effective flow sections and other relevant properties. Each pressure control device 4, 13 essentially consists of a chamber divided into three compartments by a rubber membrane 18, 18a and by a partition 20, 20a formed with a seat for a conical valve member 19, 19a attached to the membrane 18, 18a which seals the lower compartment 21, 21a of the device 4, 13 from the middle compartment 22, 22a. The gas whose pressure is to be controlled enters the lower compartment 21, 21a through a conduit 2, 12, and is discharged from the middle compartment 22, 22a.

An auxiliary pressure regulator 23 feeds compressed air from a line $A_1$ and a conduit 24 to the top compartment of the pressure control device 4, and by a conduit 24a communicating with the conduit 24 to the corresponding compartment of the device 13. Air is continuously discharged from the connected conduits 24, 24a through a vent line 24b equipped with a needle valve 25.

The pressure control device 11, which controls the pressure at the discharge end of the column 8, is similar to the devices 4, 13. Its chamber is divided into three compartments by a rubber membrane 26 and by a partition which divides the remainder of the device into compartments 28, 29 and is formed with a seat for a conical valve member 27. The compartment 29 communicates with the atmosphere through a vent opening 29a.

A helical compression spring 30 within the compartment 29 urges the membrane 26 outward of the compartment against the pressure of compressed air admitted from a supply line $A_2$ through an auxiliary pressure regulator 31 and a conduit 32 a branch 32a of which is vented to the atmosphere through a needle valve 33.

In the position of the apparatus illustrated in FIG. 2, the valve within the chromatograph enclosure 7 has been shifted from the afore-described position of FIG. 1 into another position in which a previously unused chamber 34 of the valve connects the sample conduit 12 to the atmosphere through the needle valve 17, whereas the chamber 15 is interposed between the tank 1 and the partition column 8. The chamber 6 is disconnected from the gas streams and sealed in a manner not further illustrated.

A valve arrangement functionally equivalent to that described above, but structurally modified, is shown in FIGS. 3 and 4 respectively in positions corresponding to those of FIGS. 1 and 2.

The device shown in FIG. 3 consists of a control valve 39 and a valve actuator 36 fixedly connected thereto. The common casing 35 of the valve and actuator is a stepped cylinder, the diameter of the actuator portion being much greater than that of the valve portion.

The actuator end of the casing is axially sealed by a head 40 provided with an O-ring 47 and attached to the casing 35 by screws 41 of which only one is visible in the drawing. The valve end of the casing 35 is open to the atmosphere. A piston 37 equipped with an annular sealing ring 46 divides the actuator cavity into two compartments 44, 45. Its fixedly attached piston rod 38 is movably sealed to the valve casing portion by a group of three axially spaced O-rings 54, 55, 56 near the open end of the casing 35 and by a group of three O-rings 57, 58, 59 near the piston 37. The central portion of the piston rod 37 axially intermediate the two groups of O-rings has a smaller diameter than the casing bore, and is equipped with additional O-rings 51, 52, 53 in sealing engagement with the casing wall, which axially divide the annular space between the casing and the afore-mentioned central piston rod portion into three compartments 48, 49, 50.

Radial bores in the casing 35 connect the several compartments 44, 45, 48, 49, 50 of the device with conduits illustrated in FIGS. 1 and 2, except for a control line 42 which leads to a nonillustrated pilot valve connected to a vacuum pump and to one of the compressed air lines $A_1$ or $A_2$. The line 42 is permanently connected to the compartments 44, 45 by branch lines 42a, 42b and corresponding bores 43a, 43b, nonillustrated abutments being provided to prevent axial movement of the piston 37 beyond the terminal positions shown in FIGS. 3 and 4, respectively. When the compartments 44, 45 are simultaneously connected to a source of compressed air by the nonillustrated pilot valve, the force exerted by the compressed air on the larger piston face in the compartment 45 overcomes the combined force of the compressed air on the annular piston face in the chamber 44 and of the atmospheric air on the end face of the rod 37, and moves the piston into the position shown in FIG. 3. Evacuation of both chambers 44, 45 through the nonillustrated pilot valve causes the piston to be shifted to the position of FIG. 4. The valve shown in FIGS. 3 and 4 is preferably operated automatically by a rotary pilot valve driven by a constant-speed electric motor in a known manner.

In the position shown in FIG. 3, the compartment 48 connects the helium tank 1 to the column 8, both not represented in FIG. 3, through the afore-described conduit 5, a branch conduit 5a, bores 66, 67 of the casing 35 and a conduit 8' which leads to the column 8. Another branch 5b of the conduit 5 is sealed off by the piston rod 38.

The compartment 49 connects one axial end of a cylindrical metering chamber 15' with the atmosphere through a conduit 63, bores 64, 65 in the casing 35, and the afore-described conduit 16. The other end of the chamber 15' is connected with the sampling line 12 by the line 14, bores 60, 61 communicating with the compartment 50, and a conduit 62.

When the piston 37 is shifted into the position illustrated in FIG. 4 by vacuum in the line 42, the conduits 5b and 8' communicate with each other through the compartments 50, 48 and the chamber 15', and the conduits 14 and 16 are connected by the compartment 49.

The following example illustrates the operation of the apparatus shown in FIGS. 1 and 2.

A constant air pressure is maintained in the conduits 24, 24a by the pressure regulator 23 and the needle valve 25, and this pressure provides a pneumatic signal which is applied to the identical membranes 18, 18a of the pressure control devices 4, 13. If the pressure in one or both of the middle compartments 22, 22a is lower than the signal pressure, the valve bodies 19, 19a are moved outward of the associated valve seats to admit more helium and gas mixture respectively to the conduits 5, 14 until the gas pressures in both conduits are equal to the desired absolute pressure which is uniquely related to the pressure of the compressed air signal. The needle valve 17 is set to hold the flow of the gas mixture to be analyzed through the chamber 15 at a rate at which the valve body 19 in the control device 4 is not fully lifted from its seat. In a specific embodiment of the apparatus shown in FIG. 1, the uniform and constant pressure thus established in the helium within the chamber 6 and in a mixture of hydrogen, carbon monoxide, carbon dioxide and nitrogen in the chamber 15 was 1300 millibars.

The pressure maintained at the pressure control device 11 was constant at 1090 millibars. When the gas pressure in the middle compartment of the device 11 dropped below the desired value, the valve body 27 was moved toward its seat by the air pressure acting on the membrane 26, and excessive gas pressure in the compartment 28 together with the pressure of the spring 30 tended to lift the valve body 27 from its seat.

The valve was shifted from the position of FIG. 1 to that of FIG. 2 after a period sufficient to permit purging of previously present helium from the chamber 15 by the gas mixture, and returned to the position of FIG. 1 after purging of the gas mixture by helium from the chamber 15 into the column 8. The entire cycle took 7 minutes.

In the position shown in FIG. 2, the helium, acting as a carrier gas inert to the commercial product "molecular sieve 13×," used as an adsorbent in the column 8 sequentially drove the components of the gas mixture through the detector 9 where their presence was indicated by peaks on the chart of the nonillustrated recorder in the usual manner. The stream of process gas mixture was discharged to the atmosphere during this stage of the analysis cycle through the chamber 34. The stream of helium was not significantly interrupted by shifting of the valve.

In testing the apparatus, the sample line 12 was connected to a gas holder containing a uniform mixture of 1% hydrogen, 27% carbon monoxide, 15% carbon dioxide and 57% nitrogen. 1750 sequential analyses were made of this gas. The variation coefficients of the results for the individual constituents were between 0.3 and 4%, and the overall coefficient of variation was less than 0.3%, indicating that the variations were due to the limits of accuracy within which the recorder chart could be read.

The operation of the valve arrangement illustrated in FIGS. 3 and 4 is so closely similar to that shown in FIGS. 1 and 2, that a more detailed description will not be needed by those skilled in the art. Both devices shown in the drawing instantaneously inject a precisely defined specimen of gas to be analyzed into a practically continuous stream of the inert carrier gas in such a manner as to avoid turbulence at the point and time of specimen introduction. The resulting precision of specimen introduction is reflected in very well defined peaks of the chromatogram, a high precision and accuracy of the measurements made.

While the invention has been described with specific reference to preferred embodiments, it will be understood that the invention is not limited to the examples of the invention chosen for the purpose of the disclosure but is to be construed broadly, and limited solely by the scope of the appended claims.

What is claimed is:

1. A gas chromatograph apparatus comprising, in combination:
    (a) a source of a gas mixture to be analyzed;
    (b) a source of a carrier gas;
    (c) a partition column having an intake and a discharge;
    (d) a plurality of valve means respectively interposed between said sources and said intake for admitting said gas mixture and said carrier gas at respective absolute pressures to said intake;
    (e) valve control means connecting said plurality of valve means for keeping said absolute pressures at a common valve
        (1) said valve control means including a single source of a reference signal, and applying means for applying said reference signal to each of said valve means,
        (2) said source of a reference signal including a source of a gas under pressure, a conduit connected to said source and open to the atmosphere, and an adjustable valve in said conduit,
        (3) each of said valve means communicating with said conduit for operation of said valve means by the gas of said source; and
    (f) pressure control means for maintaining at said discharge a constant absolute gas pressure lower than said common value of absolute pressures, but higher than atmospheric pressure.

2. An apparatus as set forth in claim 1, wherein said pressure control means include a source of a constant reference signal, and means for maintaining a predetermined relationship between said second-mentioned reference signal and said gas pressure at said discharge.

3. A gas chromatography apparatus comprising, in combination:
(a) a source of sample gas mixture to be analyzed;
(b) a source of a carrier gas;
(c) a partition column having an intake and a discharge;
(d) first valve means interposed between said source of carrier gas and said intake for flow of a stream of said carrier gas from said source through said valve means to said intake, and for controlling the carrier gas pressure in said stream;
(e) introducing means for introducing a sample of said mixture into said intake of said column;
(f) second valve means interposed between said sample source and said introducing means for controlling the pressure of said sample; and
(g) common valve control means connected to said first and second valve means for operating the same in such a manner that the pressure of said carrier gas and of said sample are equal.

4. An apparatus as set forth in claim 3, further comprising pressure control means for maintaining at said discharge a constant gas pressure lower than said equal pressures, but higher than atmospheric pressure.

References Cited

UNITED STATES PATENTS

| 3,041,869 | 7/1962 | Spracklen et al. | 55—386 |
| 3,250,057 | 5/1966 | Clarke | 55—197 |
| 3,240,052 | 3/1966 | Reinecke et al. | 72—23.1 |

FOREIGN PATENTS

| 692,119 | 8/1964 | Canada. |

SAMIH N. ZAHARNA, *Primary Examiner.*

REUBEN FRIEDMAN, *Examiner.*

J. DeCESARE, *Assistant Examiner.*